US011261384B2

(12) United States Patent
Bhattacharya et al.

(10) Patent No.: US 11,261,384 B2
(45) Date of Patent: Mar. 1, 2022

(54) RECOVERY OF HYDROCARBON DILUENT FROM FROTH TREATMENT TAILINGS

(71) Applicant: SYNCRUDE CANADA LTD. in trust for the owners of the Syncrude Project as such owners exist now and in the future, Calgary (CA)

(72) Inventors: Sujit Bhattacharya, Edmonton (CA); Craig McKnight, Sherwood Park (CA); Salvador Escobedo Salas, London (CA); Hugo deLasa, London (CA)

(73) Assignee: SYNCRUDE CANADA LTD. in trust for the owners of the Syncrude Project as such owners exist now and in the future, Calgary (CA)

( * ) Notice: Subject to any disclaimer, the term of this patent is extended or adjusted under 35 U.S.C. 154(b) by 0 days.

(21) Appl. No.: 17/017,369

(22) Filed: Sep. 10, 2020

(65) Prior Publication Data

US 2021/0071087 A1    Mar. 11, 2021

Related U.S. Application Data

(60) Provisional application No. 62/898,921, filed on Sep. 11, 2019.

(51) Int. Cl.
| | | |
|---|---|---|
| *C10G 1/04* | (2006.01) | |
| *B01D 3/38* | (2006.01) | |
| *B01D 1/20* | (2006.01) | |

(52) U.S. Cl.
CPC ............. *C10G 1/045* (2013.01); *B01D 1/20* (2013.01); *B01D 3/38* (2013.01); *C10G 2300/807* (2013.01)

(58) Field of Classification Search
CPC ............. C10G 1/04; C10G 1/045; B01D 3/38
See application file for complete search history.

(56) References Cited

U.S. PATENT DOCUMENTS

| | | | |
|---|---|---|---|
| 9,676,684 B2 * | 6/2017 | Duerr | ............... C10G 1/045 |
| 2005/0145418 A1 | 7/2005 | Cordova | |
| 2010/0282642 A1 | 11/2010 | Kan | |
| (Continued) | | | |

FOREIGN PATENT DOCUMENTS

| | | |
|---|---|---|
| CA | 1027501 A | 3/1978 |
| CA | 2272035 C | 11/2000 |
| CA | 2272045 C | 11/2000 |
| (Continued) | | |

OTHER PUBLICATIONS

Yongguang Hu, Noman Ali Buttar, Josef Tanny, Richard L. Snyder, Michael J. Savage, Imran Ali Lakhiar, "Surface Renewal Application for Estimating Evapotranspiration: A Review", Advances in Meteorology, vol. 2018, Article ID 1690714, 11 pages, 2018.
(Continued)

*Primary Examiner* — Renee Robinson
(74) *Attorney, Agent, or Firm* — Bennett Jones LLP

(57) ABSTRACT

A method for recovering hydrocarbon diluent present in froth treatment tailings, comprising introducing the tailings into a vessel; adding a first portion of steam into the vessel to form a vapour-tailings interface; and operating the vessel to increase the exposure of the tailings to the vapour-tailings interface formed in the vessel.

6 Claims, 8 Drawing Sheets

(56) References Cited

U.S. PATENT DOCUMENTS

2011/0278202 A1* 11/2011 Moran ............... B01D 17/0205
208/424

FOREIGN PATENT DOCUMENTS

| CA | 2587166 | C  | 9/2007  |
|----|---------|----|---------|
| CA | 2712725 | C  | 11/2011 |
| CA | 2768852 | C  | 11/2011 |
| CA | 2755637 | A1 | 4/2012  |
| CA | 2733342 | C  | 9/2012  |
| CA | 2924307 | A1 | 3/2016  |

OTHER PUBLICATIONS

Costa, J. et al., "Effect of Solids on Gas-Liquid Mass Transfer", Universidade do Minho, Aug. 2009.

* cited by examiner

RECOVERY OF HYDROCARBON DILUENT FROM FROTH TREATMENT TAILINGS

FIELD OF THE INVENTION

The present invention relates to a method and apparatus for recovery of a hydrocarbon diluent from froth treatment tailings produced in a bitumen froth treatment plant. More particularly, hydrocarbon diluent is removed from the froth treatment tailings by enhancing immiscible phase renewal at the gas-slurry interface.

BACKGROUND OF THE INVENTION

Oil sand, as known in the Fort McMurray region of Alberta, Canada, comprises water-wet sand grains having viscous bitumen flecks trapped between the grains. The oil sand lends itself to separating or dispersing the bitumen from the sand grains by slurrying the as-mined oil sand in water so that the bitumen flecks move into the aqueous phase.

Water-based bitumen extraction processes typically involve slurrying the oil sand ore with heated water and, optionally, a process aid such as caustic (NaOH), and then conditioning the oil sand slurry in tumblers or a hydrotransport pipeline to release the bitumen from the oil sand. The conditioned oil sand slurry is then subjected to separation in one or more separation apparatus to form a bitumen froth.

The bitumen froth, which generally comprises 60 wt % bitumen, 30 wt % water and 10 wt % solids, is then subjected to further processing before the bitumen can be upgraded. More particularly, it is conventional to dilute the bitumen froth with a light hydrocarbon diluent, such as naphtha or a paraffinic diluent, to first improve the difference in specific gravity between the bitumen and water and to reduce the bitumen viscosity, thereby aiding in the separation of the water and solids from the bitumen. Separation of the bitumen from water and solids is commonly achieved by treating the diluent diluted froth in a sequence of inclined plate settlers, scroll and disc centrifuges, and the like. Other processes for separating solids and water from diluted bitumen froth are known in the art.

The primarily water and solids fraction obtained after separation is commonly referred to as froth treatment tailings. Paraffinic froth treatment tailings typically comprise water, asphaltenes, fines solids, bitumen and about 5-10 wt % residual paraffinic solvent. Naphthenic froth tailings typically comprise 20 wt % fine solids, 3 wt % bitumen and about 2 wt % naphtha, with water making up the remainder of the stream. It is desirable both economically and environmentally to recover the hydrocarbon diluent from the tailings prior to disposal of the tailings to meet the regulated volatile organic compound (VOC) emissions limit.

Typically, the consolidated froth treatment tailings produced during naphthenic froth treatment is steam stripped in a naphtha recovery unit (NRU) to recover about 85% of the naphtha (see, for example, Canadian Patent No. 2,272,045, hereinafter referred to as the "steam stripping process"). In particular, the froth treatment tailings enter a steam stripping vessel at near atmospheric pressure and flow down numerous shed decks, where the tailings form thin layers on the shed decks where they meet stripping steam flowing countercurrently. The stripped tailings gather in the bottom slurry pool and are pumped out of the vessel. Live steam is introduced below the shed decks but above the slurry pool. However, the treated tailings still contain about 0.2-0.3 wt % naphtha. At present, the solvent loss is below the regulated emissions limit, however, it is desirable to minimize naphtha loss even further from both an environmental and an economic perspective.

Equilibrium simulation shows that nearly 100% naphtha recovery should be achieved for an idealized system without solids when the steam-to-feed mass ratio is more than 0.1. In reality, however, the recovery is far lower. The low actual recovery of the NRU is believed to be caused mainly by inadequate breaking of the naphtha's attachment to the solids, either in solids pores or on the surface. New research also indicates that inadequate contacting between vapour and the hydrocarbon suspended in the water/solids rich slurry phase may be another contributing factor. Live steam stripping as used in the above-discussed NRU is inherently limited in both these aspects.

Thus, a new method and apparatus is needed to overcome these limitations to achieve 90+% naphtha recovery.

SUMMARY OF THE INVENTION

The hydrocarbon diluent present in froth treatment tailings generally exists as diluent diluted bitumen ("dilbit") films or droplets, some of which are adsorbed or absorbed on to solids individually or physically trapped between solids to form dilbit-solids aggregates. While it is possible that some bitumen-free diluent film/droplets may also exist, it is more likely that this component is absent since hydrocarbon diluent and bitumen are completely miscible and the two components undergo many stages of mixing in the froth treatment plant.

In particular, it was observed by the present applicant that if froth treatment tailings are allowed to settle in a container for a period of time, surprisingly the majority of the hydrocarbons (hydrocarbon diluent+bitumen) will report to the bottom, even though dilbit on its own is lighter than water. This is due to the dilbit being associated with solids (adsorbed/absorbed or mechanically trapped) and the dilbit-solids aggregates have a higher apparent density, thereby causing the aggregates to remain at the bottom. Even after the container is vigorously shaken, the hydrocarbon will remain in the bulk rather than rise to the surface to form a layer adjacent to the atmosphere.

Thus, when attempting to contact the tailings slurry with a vapour phase, it is likely that the majority of the solids and the associated hydrocarbons will not be readily available at the vapour-slurry interface in order to release the hydrocarbon diluent (as per thermodynamic equilibrium) unless a mechanism is provided for the hydrocarbon aggregates to become continuously available at the vapour-slurry interface. This requirement provides an additional challenge for diluent recovery from froth treatment tailings slurry as compared to traditional vapour-liquid mass transfer.

As previously mentioned, Canadian Patent No. 2,272,045 teaches the method of contacting steam with tailings slurry flowing over shed decks thereby forming thin films. However, actual operations have revealed that the formation of the films and hence contacting between the vapour and slurry is not very effective in this case. In a more recent development, disclosed in Canadian Patent No. 2,712,725, steam-tailings contacting is achieved by adding steam into the slurry pool and accompanying this with vigorous mixing with an added stirrer so that small steam bubbles are generated which are distributed throughout the slurry. However, in a commercial scale vessel, such operation can be problematic to sustain. Thus, the present invention is directed at improving the continuous exposure of the hydrocarbon laden phase (i.e., dilbit-solids and dilbit-solids aggregates) at the vapour-slurry interface using an efficient means that is operationally simple.

In one aspect of the present invention, a method for recovering hydrocarbon diluent present in froth treatment tailings is provided comprising introducing the tailings into a vessel; adding a first portion of steam into the vessel to form a vapour-tailings interface; and operating the vessel to increase the exposure of the tailings to the vapour-tailings interface formed in the vessel.

In one embodiment, medium pressure steam is injected into the tailings prior to introducing the tailings into the vessel. The heat and the turbulence generated by the addition of the steam assists in the separation of the hydrocarbon from the solids aggregate. In one embodiment, the vessel is a conical vessel and the hot steam-tailings mixture is then introduced tangentially into the vessel where, first, the diluent laden vapours disengage and, second, a thin rotating film of the slurry forms along the peripheral walls of the conical vessel. The detached hydrocarbon phase move towards the vapour-liquid interface, from which further diluent is stripped by fresh steam added into the bottom of the vessel. In one embodiment, the wall of the conical vessel can be heated externally such as with an external steam jacket.

In one embodiment, the tailings are introduced into the vessel together with steam at or near the top of the vessel using at least one atomizing nozzle to atomize the tailings, thereby allowing the hydrocarbon diluent in the tailings to reach the vapour-tailings interface that forms at the surface of each droplets.

In one embodiment, the vessel is a slurry bubble column and the steam is bubbled into the tailings pool at or near the bottom of the vessel thereby forcing contact between tailings and the vapour inside the steam bubbles. In one embodiment, a draft tube is introduced into the vessel to circulate the slurry inside and increase the time of contact between the steam and the tailings to achieve equilibrium.

In one embodiment, the vessel comprises:
a body enclosing a separation chamber having a conical section;
a tailings feed inlet for introducing the tailings and a second portion of steam tangentially into the vessel;
a steam inlet for adding the first portion of steam into the conical section; and
an outlet at the top of the separation chamber for removing a vapour stream of hydrocarbon diluent therethrough.

In one embodiment, the vessel further comprises a heating device located on an external wall of the conical section of the separation chamber. In one embodiment, the heating device is an external steam jacket.

In one embodiment, the vessel comprises:
a body enclosing a separation chamber having a top and a bottom;
at least one atomizing nozzle positioned near the top of the separation vessel for introducing the tailings and a second portion of steam into the separation chamber;
a steam inlet positioned near the bottom of the separation chamber for introducing the first portion of steam; and
an outlet at the top of the separation chamber for removing a vapour stream of hydrocarbon diluent therethrough.

In one embodiment, the vessel comprises:
a body enclosing a separation chamber having a top and a bottom;
a draft tube located coaxially in the separation chamber;
a tailings feed distributor positioned in the annular section of the separation chamber for introducing the tailings into the separation chamber;
a first steam sparger located in the annular section of the separation chamber below the tailings distributor for adding the first portion of steam as steam bubbles into the annular section;
a second steam sparger located near the bottom of the cylindrical draft tube for adding a second portion of steam as steam bubbles into the cylindrical draft tube; and
an outlet at the top of the separation chamber for removing a vapour stream of hydrocarbon diluent therethrough.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein:

FIGS. 4A and 4B illustrate the mechanism for an immiscible mixture of diluted bitumen (dilbit; 97.5 wt %) and water (2.5 wt %) at low impeller speed and high impeller speed, respectively. FIGS. 4C and 4D illustrate the mechanism for an immiscible mixture of water (97.5 wt %) and diluted bitumen (dilbit; 2.5 wt %) at low impeller speed and high impeller speed, respectively.

FIGS. 5C and 5D are schematic views of the tailings of FIGS. 5A and 5B, respectively. FIGS. 5E and 5F are schematic views of the mass transfer steps required for stripping naphtha from the tailings of FIGS. 5A and 5B, respectively.

DESCRIPTION OF THE PREFERRED EMBODIMENT

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

The present invention is directed to a method and apparatus for improving hydrocarbon diluent removal from froth treatment tailings by enhancing immiscible phase renewal at the gas (vapour)-slurry interface.

Example 1 below illustrates that, in the case of immiscible mixtures with differing physical properties, the concentration of the phases and the hydrodynamics of the system can allow or prevent the heavier phase from being exposed to the vapour-liquid interface and, hence, impact the amount of the heavy material undergoing phase change.

EXAMPLE 1

Laboratory Scale Experimental Setup

Figure 1:
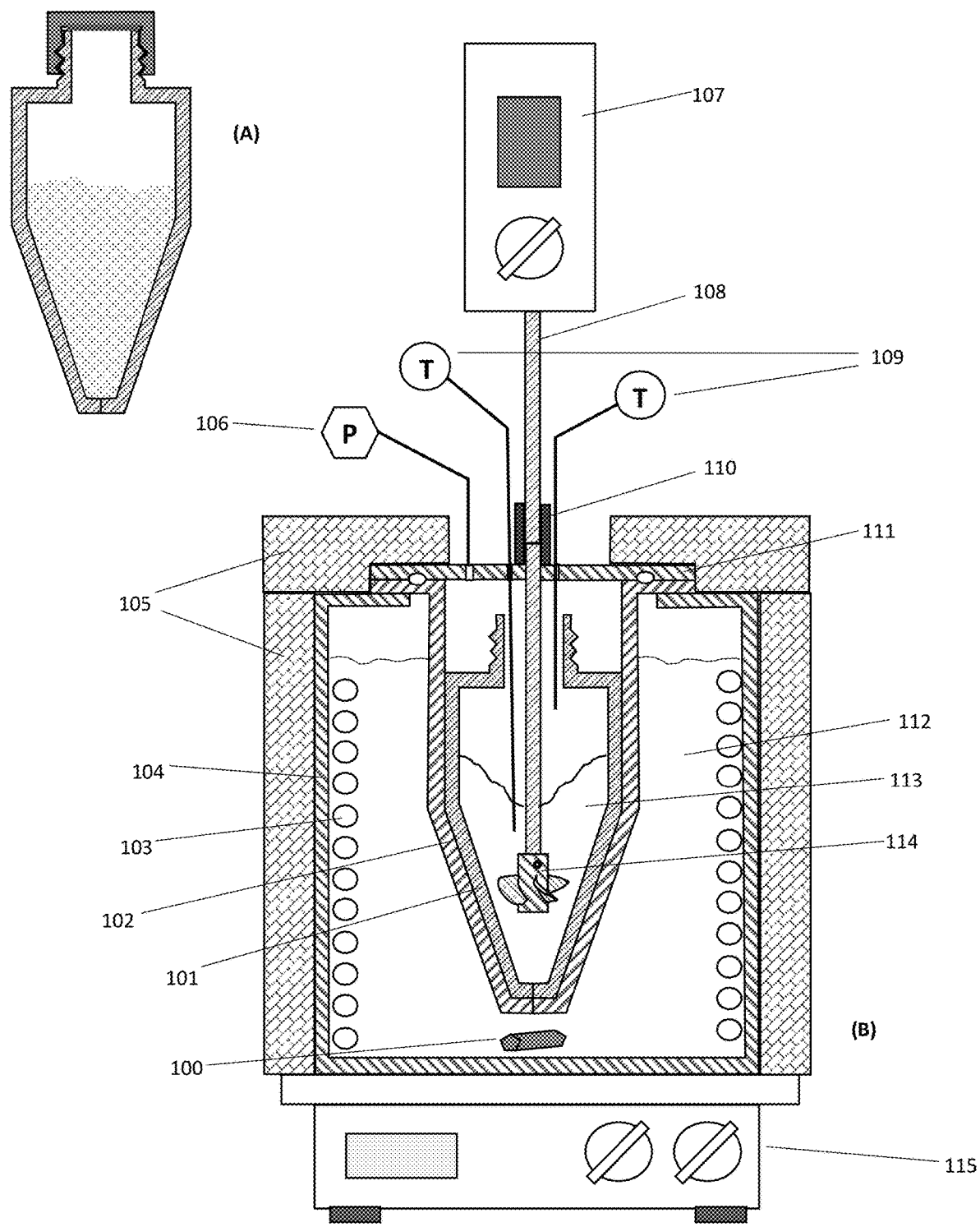
FIG. 1A is a schematic of a sample bottle for use in a vapour pressure measurement device.
FIG. 1B is a schematic of a measurement cell for use in a vapour pressure measurement device.

Vapour pressure measurements were carried out in a vapour-slurry cell shown in FIGS. 1A and 1B. Up to 100 mL sample is collected into the stainless steel, 190 mL sample bottle shown in FIG. 1A. The bottle is capped to prevent any loss of volatiles. For measurements, the sample bottle is uncapped and then placed into the experimental set-up shown in FIG. 1B.

The sample bottle (101) containing the sample (113) is placed into the sample holding cell (102), also made of stainless steel, and contoured so that the sample bottle fits snugly into it. Once placed into the measurement setup, the cell is closed with lid with an O-ring (111). The lid contains airtight ports for a pressure gauge (not shown), pressure transducer (106), thermocouples (109), and a mechanical seal (110) through which a shaft (108) is introduced into the sample (113) containing an impeller (114). The shaft is rotated by a motor (107) at a predetermined speed and allows agitation and mixing of the sample. A set of thermocouples (109) allow the measurement of temperature at two different locations in the vessel, e.g., the vapour and the liquid. The thermocouple is connected to a temperature data acquisition box. This data acquisition box is interfaced with a USB desktop computer port. As a result, experimental data can be stored and displayed using a data acquisition software. The pressure transducer (106) and the pressure gauge allows simultaneously measurement of the saturation vapour pressure using two independent methods inside cell. This pressure transducer data is also logged into a desktop USB port. Thus, one can observe and register the changes of pressure using the data acquisition software.

The sample holding cell (102) sits inside an outer vessel (104) surrounded by insulation (105) and containing a thermal fluid (112) for heating. Thermal fluid (112) is agitated with a stirrer bar (100) to prevent heat gradients within it. Outer vessel (104) also contains a copper coil (103) through which hot or cold fluid can be circulated to allow fine control and/or rapid changes in temperature of thermal fluid (112) and sample (113). The stirrer bar speed (e.g. 350 rpm) is controlled with the magnetic stirrer (115) which also houses the hot plate and the temperature control assembly used to control the rate of heating of thermal fluid (112) so that the fluids can be heated up in a predetermined ramp.

Experiments established that with the agitation available, a ramp rate between 1 to 1.5C/min was sufficient to prevent lag between the temperature profile of thermal fluid (112) and sample (113). The sample bottle and measurement cell described in FIGS. 1A and 1B allows one to analyze a process sample directly, avoiding losses of light volatile components due to sample transfers. Moreover, the experimental procedure used is consistent with the ASTM D5191-13 Mini Method for Petroleum Products.

During testing, the hot plate was programmed to provide heat to allow the thermal fluid temperature to increase in ramps. The thermal fluid in turn ramped up the sample temperature from the initial to the final set point. The sample temperature and the vapour space pressure was recorded continuously over the experimental run.

Experimental Results

The apparatus described in FIGS. 1A and 1B was used to measure the pressure generated by the vapour (henceforth, "vapour pressure") produced from a sample consisting of an immiscible mixture of water and an oil. Naphtha diluted bitumen obtained from naphthenic froth treatment was chosen as the oil phase.

Figure 2:
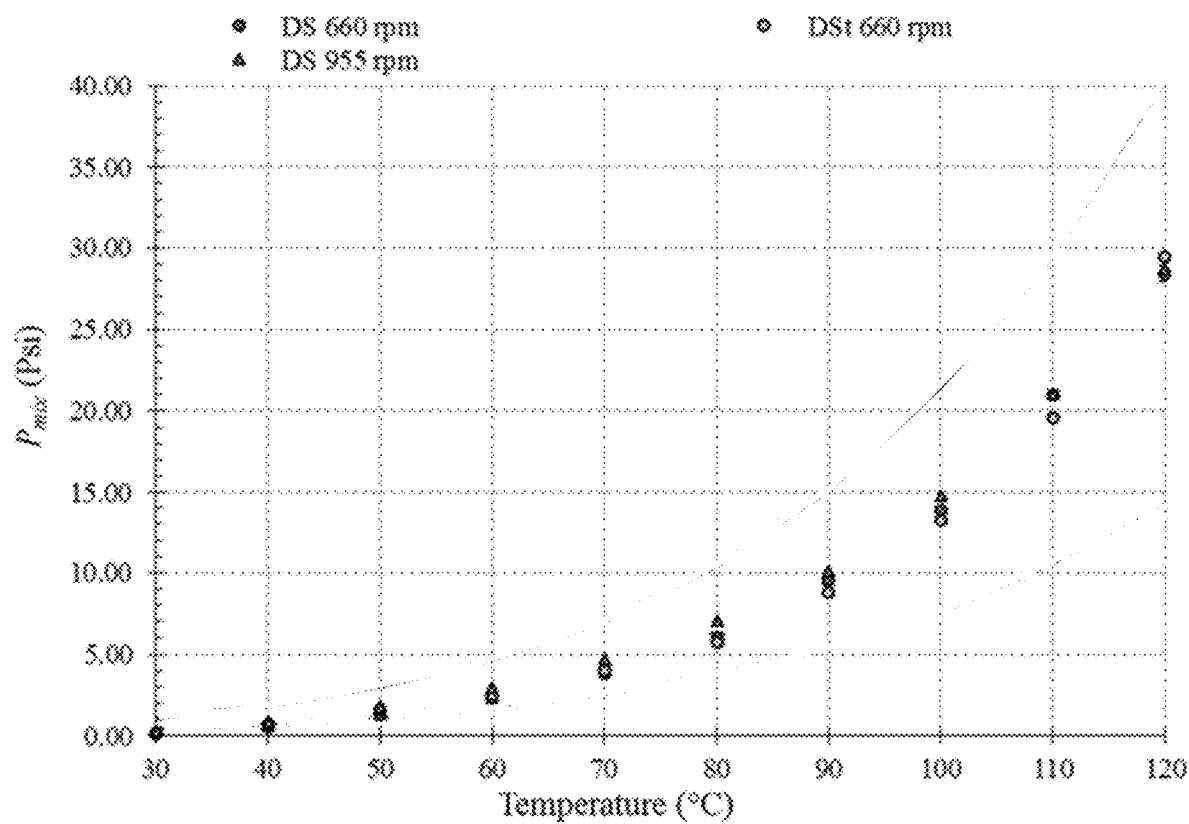
FIG. 2 is a graph showing the impact of impeller rotational speed on the vapour pressure generated by an immiscible mixture of diluted bitumen (dilbit; 97.5 wt %) and water (2.5 wt %).
Figure 3:
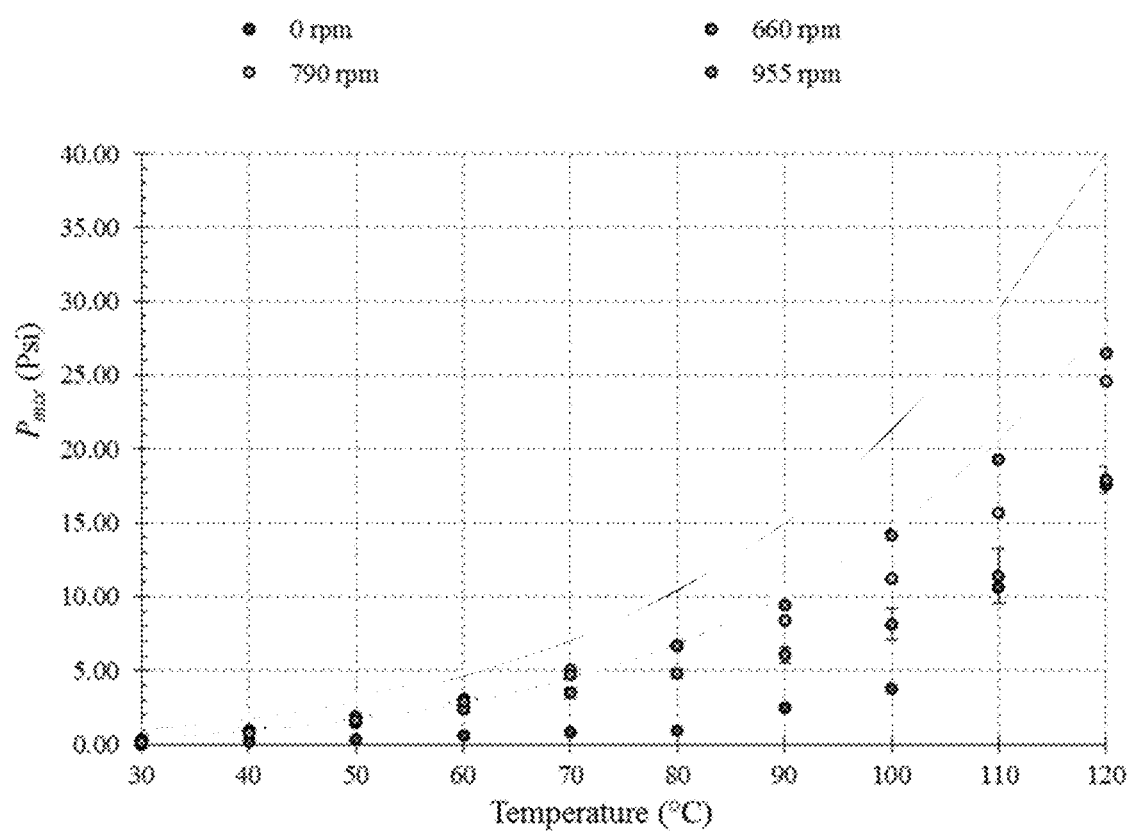
FIG. 3 is a graph showing the impact of impeller rotational speed on the vapour pressure generated by an immiscible mixture of water (97.5 wt %) and diluted bitumen (dilbit; 2.5 wt %).

FIG. 2 shows the results for measurement of the vapour pressure of a mixture of 97.5 wt % diluted bitumen (henceforth called "dilbit") and 2.5 wt % water. Results are shown for a multitude of impeller speeds. As can be seen in FIG. 2, there was no impact of impeller speed on the vapour pressure generated by this mixture of immiscible components. FIG. 3 shows the results for measurement of the vapour pressure in the inverse case where the mixture consists of 97.5 wt % water and only 2.5 wt % dilbit at multitude impeller speeds. Surprisingly, in this case it was seen that there was a significant impact of the impeller speed on the vapour pressure generated by the mixture. As the impeller speed was increased, more and more water (which is heavier than the oil) was exposed to the vapour-liquid interface generating additional pressure.

FIGS. 2 and 3 illustrate that in the case of immiscible mixtures with differing physical properties, the concentration of the phases and the hydrodynamics of the system can allow or prevent the heavier phase from being exposed to the vapour-liquid interface and, hence, impact the amount of the heavy material undergoing phase change.

Figure 4:
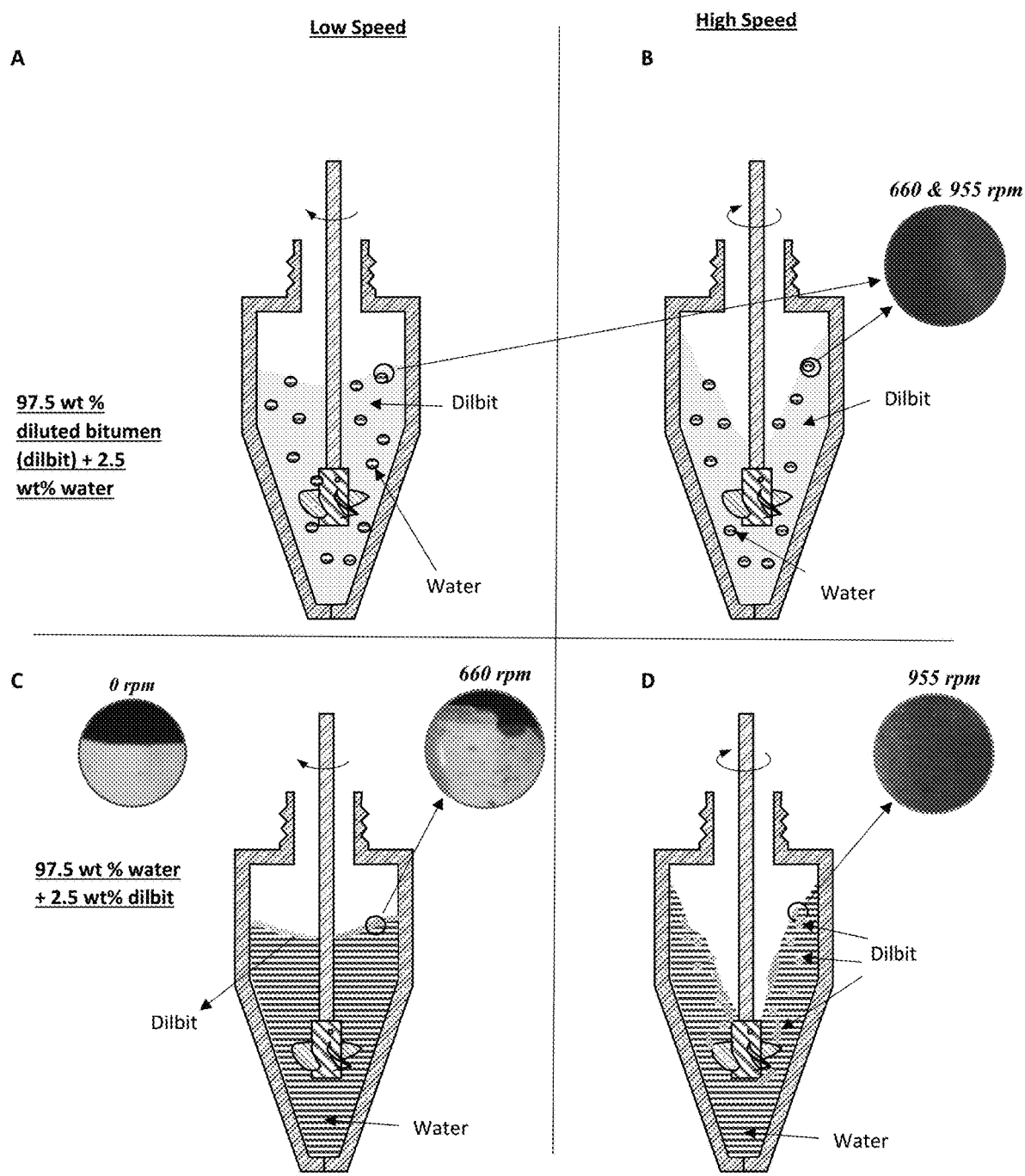
FIGS. 4A-D are schematic diagrams that visualize mass transfer steps in steam stripping of naphtha from froth treatment tailings.

FIGS. 4A-D are schematic diagrams explaining the mechanisms resulting from the observations outlined in FIGS. 2 and 3. FIGS. 4A and 4B illustrate the hypothesized mechanism for the high dilbit-low water concentration case, while FIGS. 4C and 4D illustrate the hypothesized mechanism for the high water-low dilbit case. FIGS. 4A and 4C represent conditions with low impeller speed and FIGS. 4B and 4D represent conditions with high impeller speed. In the case of 97.5 wt % dilbit and 2.5 wt % water (FIGS. 4A and 4B), the heavier phase (water) is efficiently dispersed from the active impeller zone and distributed throughout the mixture at both impeller speeds studied. Similar, albeit small, amounts of water report to the vapour-liquid interface in both cases causing similar increase in the overall pressure in the cell beyond that for dilbit alone (not shown).

In the inverse case, with only 2.5 wt % dilbit in 97.5 wt % water (FIGS. 4C and 4D), the dilbit (lighter phase) exists mainly floating at the interface away from the active impeller zone when impeller speed is low. As the impeller speed is increased, more and more of the dilbit is pulled back into the water phase thereby exposing more water (heavier phase) to the interface, allowing higher pressure in the time available at that step of the temperature ramp. This process continues with increasing mixing speed until significant amounts of water is exposed to the interface and the vapour pressure is driven mainly by water.

Figure 5:
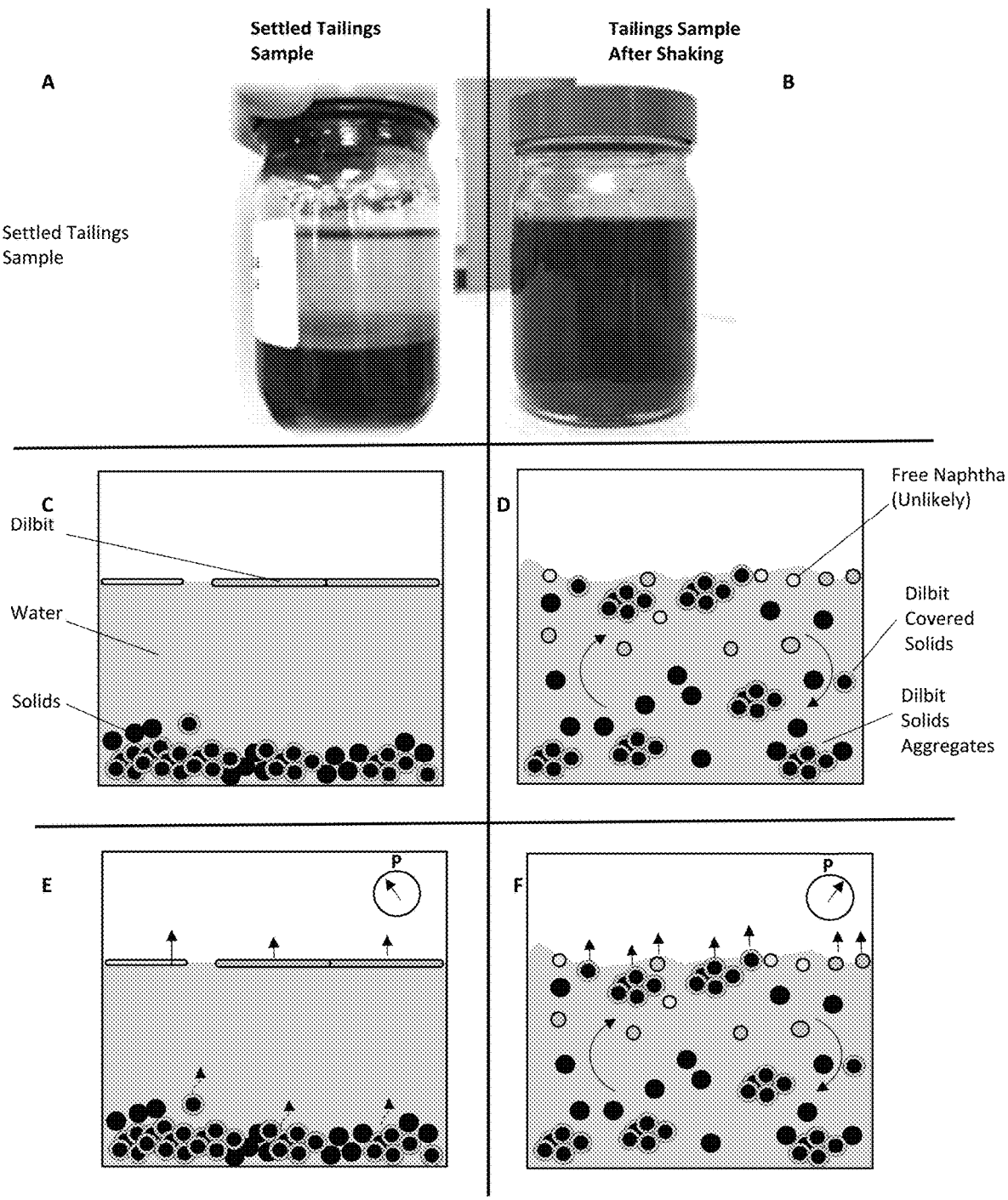
FIGS. 5A-B are photographs of a froth treatment tailings sample in a 4 oz. glass jar before and after shaking, respectively.
FIGS. 5C-F are schematic diagrams that visualize mass transfer steps in steam stripping of naphtha from froth treatment tailings.

These results provide insights into the mechanism of evaporation of naphtha in the steam stripping process for naphtha recovery from froth treatment tailings. A schematic representation of the froth treatment tailings slurry is shown in FIG. 5. As previously discussed, dilbit can exist in the slurry in the form of dilbit films or droplets, which are adsorbed or absorbed on to solids individually or physically trapped between solids to form dilbit-solids aggregates. Bitumen-free naphtha film/droplets may be present but unlikely. Finally, some of the dilbit may be present in droplet form not associated with solids.

FIGS. 5A and 5B show photographs of a tailings sample in a 4 oz. glass jar before (5A) and after (5B) shaking the jar. In particular, FIG. 5A shows a tailings sample after it has been allowed to settle undisturbed for a long period of time at low temperatures (to minimize naphtha loss). It is clearly seen that on being allowed to settle, the majority of the hydrocarbons (dark colour) report to the bottom of the jar. While dilbit on its own is lighter than water, and, therefore should float, when it is associated with solids (adsorbed/absorbed or mechanically trapped), the dilbit-aggregates have a higher apparent density, thereby causing them to remain at the bottom.

FIG. 5B is a photograph of the same sample, but after shaking by hand for a few minutes. When agitated, the heavy material at the bottom is suspended so that it is now distributed throughout the volume of the liquid including at the surface. Using this observation, a schematic view of the slurry can be hypothesized to describe its condition before and after agitation, as shown in FIGS. 5C and 5D. In FIG. 5C, the hydrocarbons (dilbit) associated with the solids are at the bottom with only a small film of unassociated dilbit (or naphtha) at the surface. In FIG. 5D, when the same slurry undergoes strong agitation, the majority of the solids and the associated hydrocarbons are suspended and available at the vapour-slurry interface.

The mass transfer steps by which the volatiles (naphtha in this case) are transported from the slurry to the vapour is hypothetically explained in FIGS. 5E and 5F. In the case of the settled slurry in FIG. 5E, only the naphtha at the surface can escape. Any naphtha at the bottom would have to detach from the dilbit and diffuse/convect through the water layer to reach the surface, which is highly unlikely. Hence, the pressure in the vapour phase is primarily driven by the phases at the interface (mainly water and some hydrocarbon) and is similar to water. However, when the sample is mixed (FIG. 5F), solids associated hydrocarbon can now reach the surface and release its naphtha (as per thermodynamic equilibrium), allowing the vapour pressure to build to its thermodynamic limit.

Figure 6:
FIG. 6 is a schematic visualization of mass transfer in prior art steam stripping of naphtha from froth treatment tailings.

When the slurry is laid out in a thin layer, more hydrocarbon aggregates are automatically exposed to the vapour and can participate in the mass transfer from slurry to vapour. This concept is shown schematically in FIG. 6. In prior art steam stripping exposure of the hydrocarbon phase is achieved by distributing the slurry into a thin layer on shed decks and the like. It is well-established that mass transfer efficiencies in these kinds of geometries are very low. Clearly, better exposure of the hydrocarbon to the interface by better interfacial renewal of the hydrocarbon species is critical to the efficiency of the stripping process. This invention describes some equipment configuration that utilizes specific features to overcome these specific mass transfer limitations for immiscible systems with multiple phases.

Figure 7:
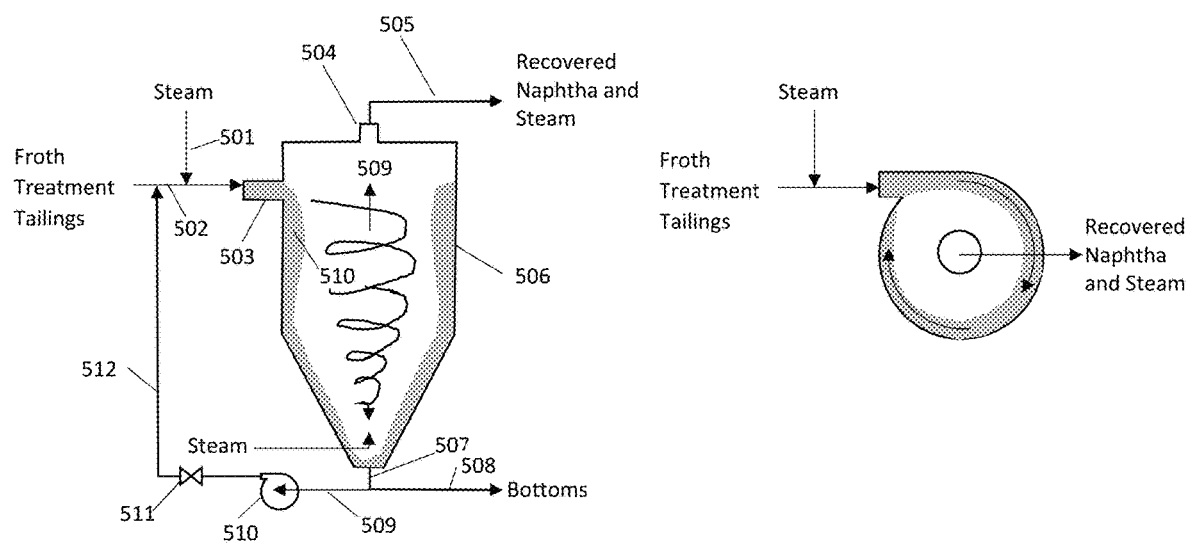
FIG. 7 illustrates a conical heated vessel with tangential feed inlet useful in practicing the method of the present invention.

FIG. 7 shows a device (506) that can be used to bring solids-dilbit and solids-dilbit aggregates closer to the vapour-slurry interface to allow more efficient stripping of naphtha from the dilbit by steam. Froth treatment tailings are introduced into the inlet of the device (503) by means of a first conduit (502). Fifty (50) psig or higher pressure steam is added into the slurry through a second conduit (501). The steam heats the slurry and is also useful in fully or partially breaking up the dilbit-solids aggregates. The steam-slurry mixture is introduced into the vessel tangentially through inlet (503), thereby creating a rotational motion in the slurry. The slurry forms a thin layer (510) along the wall of the conical device due to the centrifugal force exerted by the rotating motion. Any dilbit that has been released from the aggregate moves to the inner surface while the solids, etc. move to the vessel wall.

Additional steam is added through a steam inlet (511) at or near the bottom of the device (506). The steam present in the steam-slurry mixture as well as the additional steam added into the vessel heats the slurry thin layer (510) to strip naphtha from the slurry. The naphtha-vapour mixture (509) moves upwards and exits through the outlet (504) and then through a third conduit 505 for naphtha recovery by condensation and decantation to separate naphtha from water. The naphtha depleted slurry flows downwards in a spiral and the additional steam introduced through 506 allows more naphtha to be recovered from the thin fluid layer. Finally, the naphtha depleted tailings stream is removed via the bottom outlet (507) and conveyed via a forth conduit (508) to the tailings pond (not shown).

In one embodiment, part of the depleted slurry may be recycled back to the inlet via conduit 509 to increase the overall time of contract between the slurry and the vapour. The recycled stream can be pumped (510) through a high shear device such as a valve or a static mixer (511) to increase dissociation of the hydrocarbon from dilbit-solids aggregate and added back to the feed conduit through conduit 512. In another embodiment, the exterior wall of the device (503) may further comprise a steam jacket or some other external heating device to keep its wall at a higher temperature (i.e., above the slurry temperature) to assist in further removal of hydrocarbon from the dilbit-solids aggregate moving towards the wall. In one embodiment, the wall is heated so that its temperature is about 5° C. to about 10° C. above the slurry temperature.

In operation, a film of dilbit is formed at the vapour-slurry interface and the relatively small thickness of the layer of the slurry along the wall of the vessel (506) allows more probability of hydrocarbons to be exposed to the vapour than the case where thick uncontrolled streams of slurry falling from shed decks contact the vapour as in a traditional NRU. The longer residence time of the rotating slurry in the column would also be beneficial for naphtha recovery.

Figure 8:
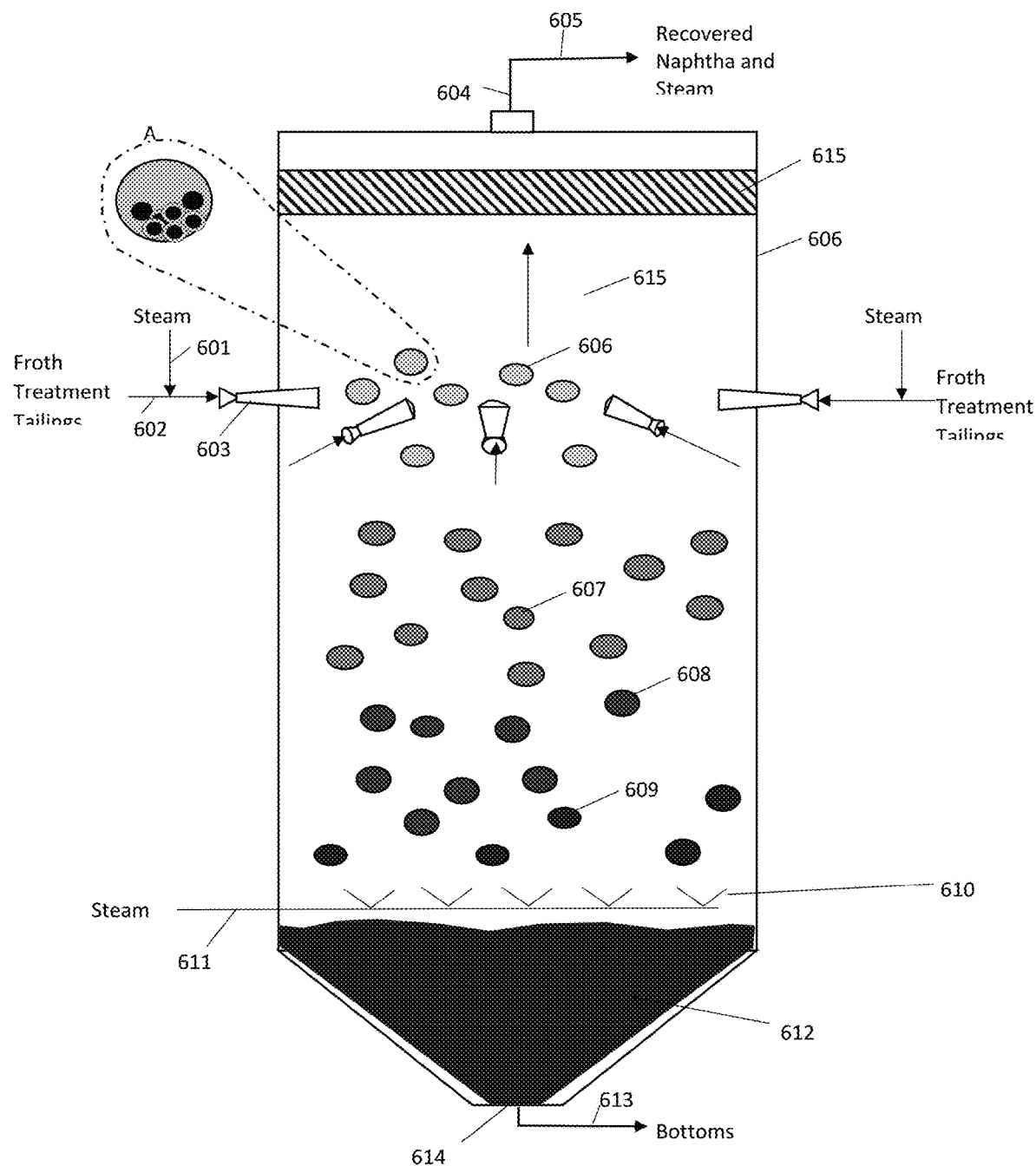
FIG. 8 illustrates a stripping tower useful in practicing the method of the present invention.

FIG. 8 shows another device for naphtha recovery by surface exposure of hydrocarbons. In this case, the feed slurry is atomized to generate fine slurry droplets, thereby allowing higher probability for the dilbit to reach the slurry-vapour interface to allow stripping of naphtha. Steam (50 psig or higher pressure) is added via a first steam conduit (601) directly into the froth treatment tailings conveyed through tailings conduit (602). The steam-tailings mixture is then allowed to pass through at least one atomization nozzle (603) which atomizes the slurry into fine droplets. A plurality of nozzles (603) can be arranged circumferentially around the stripping tower (606) or arranged both circumferentially and longitudinally along the length of the tower to improve stripping efficiency. Additional steam is introduced near the bottom of the tower through a second steam conduit (611) that feeds into a steam distributor (610), which can be a tree-type distributor or a ring distributor.

The naphtha-rich droplets fall through the rising steam from steam distributor (610) and vapours, which allow naphtha to be stripped from the hydrocarbon exposed at the droplet-vapour interface. The vapour (615), consisting of naphtha and uncondensed steam, rises out of outlet (604), and is sent for naphtha recovery by condensation and decantation via vapour conduit (605). The droplets progressively undergo naphtha recovery so that the naphtha concentration is reduce in the droplets (represented by the gradual change in the shading of droplets represented by droplets 606, 607, 608, 609. Finally, the naphtha depleted droplets fall into the bottom pool (612). Residual tailings are removed from the pool via outlet (614) and conveyed to the tailings pond (not shown) via conduit (613). In another embodiment, the nozzles (603) can be replaced with a feed distributor to generate fine droplets of tailings feed to achieve the same objective.

Figure 9:
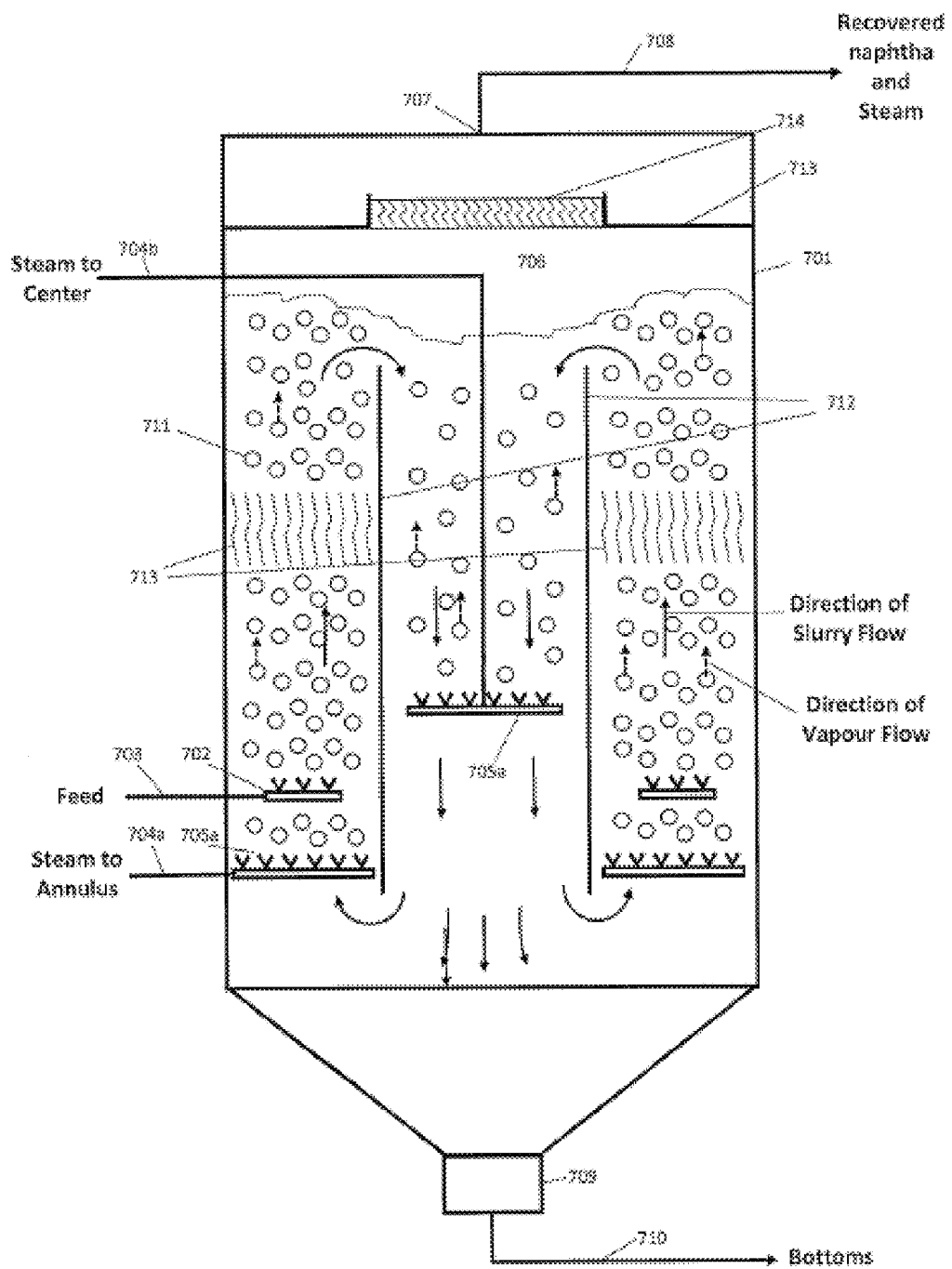
FIG. 9 illustrates a slurry bubble column useful in practicing the method of the present invention.

FIG. 9 shows naphtha recovery using a slurry bubble column. Froth treatment tailings are added into the annular region of a slurry bubble column (701) partitioned with a draft tube (712), through distributor (702) via tailings conduit (703). Steam is introduced also in the annular region but below the feed distributor through a ring type steam sparger (705a) via steam conduit (704a). Steam is also introduced at an axially higher location in the central region of the column via steam conduit (704b) into a steam sparger (705b), which can be branched or a ring sparger. Steam flow rate through the annular sparger (704a) and central sparger (704b), respectively, are adjusted such that the density of the vapour-slurry mixture within the draft tube is greater than the density of the vapour-slurry in the annular region, and the slurry circulates from the annular to the central region from the top and partially from the central to annular region in the bottom. Steam bubbles (711) rise upwards through both regions of the bubble column stripping naphtha from the slurry. The bubbles (711) intimately mix with the slurry thereby forcing contact of the hydrocarbon in the slurry with the vapour inside the bubbles.

By circulating the slurry, additional residence time is provided for contact between the vapour and the hydrocarbon in the slurry. The naphtha rich bubbles disengage from the slurry near the top of the column (706), pass through a demister (714) supported on mechanical structure (713) to remove entrained slurry droplets. The naphtha rich bubbles then rise through the outlet (707) and are transported via naphtha conduit (708) to the condensing and decanting section for naphtha separation from condensed water. The naphtha-depleted slurry is withdrawn from the bottom of slurry bubble column (701) via slurry outlet (709) and is conveyed via slurry conduit (710) to the tailings pond (not shown). Some form of a mixing device such as vertical or longitudinal baffles can be added in the upflowing annular region for better mixing of vapour and the slurry.

From the foregoing description, one skilled in the art can easily ascertain the essential characteristics of this invention, and without departing from the spirit and scope thereof, can make various changes and modifications of the invention to adapt it to various usages and conditions. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

What is claimed:

1. A method for recovering hydrocarbon diluent present in froth treatment tailings, comprising introducing the tailings into an annular region of a vessel; adding a first portion of steam into the annular region of the vessel below the introduced tailings; adding a second portion of steam into a central region of the vessel to circulate the tailings from the annular region to the central region to form a vapour-tailings interface; and operating the vessel to increase the exposure of the tailings to the vapour-tailings interface formed in the vessel.

2. The method of claim 1, wherein the central region of the vessel comprises a draft tube therethrough.

3. The method of claim 2, wherein the first portion of steam is bubbled into the annular region and the second portion of steam is bubbled into the draft tube in the central region at the bottom of the draft tube thereby forcing contact between tailings and the vapour inside the steam bubbles.

4. The method in claim 1, wherein steam is of 50 psig or higher and the vessel is operated at a pressure of 100 kPag to 200 kPag.

5. The method of claim 1, wherein the vessel comprises:
a cylindrical draft tube located coaxially in the vessel;
a tailings feed distributor positioned in the annular region of the vessel for introducing the tailings into the annular region of the vessel;
a first steam sparger located in the annular region below the feed distributor for adding the first portion of steam as steam bubbles into the annular region;
a second steam sparger located at the bottom of the cylindrical draft tube for adding a second portion of steam as steam bubbles into the cylindrical draft tube; and
an outlet at the top of the vessel for removing a vapour stream of hydrocarbon diluent therethrough.

6. The method of claim 1, wherein a mixing device comprising vertical or longitudinal baffles is added to the annular region.

* * * * *